(12) United States Patent
Buchty

(10) Patent No.: US 12,179,281 B2
(45) Date of Patent: Dec. 31, 2024

(54) CRIMPING SONOTRODE

(71) Applicant: Herrmann Ultraschalltechnik Gmbh & Co. KG, Karlsbad (DE)

(72) Inventor: Valentin Buchty, Ettlingen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 41 days.

(21) Appl. No.: 18/123,276

(22) Filed: Mar. 18, 2023

(65) Prior Publication Data

US 2023/0294199 A1 Sep. 21, 2023

(30) Foreign Application Priority Data

Mar. 21, 2022 (DE) ...................... 10 2022 106 570.7

(51) Int. Cl.
*B23K 20/00* (2006.01)
*B23K 20/10* (2006.01)

(52) U.S. Cl.
CPC .................. *B23K 20/106* (2013.01)

(58) Field of Classification Search
CPC .............................. B23K 20/10; B23K 20/106
See application file for complete search history.

(56) References Cited

U.S. PATENT DOCUMENTS

| | | | |
|---|---|---|---|
| 3,824,138 A | 7/1974 | Karobath et al. | |
| 3,972,758 A | 8/1976 | Bieber | |
| 4,187,768 A * | 2/1980 | Suzuki | B29C 65/08 53/373.7 |
| 4,619,636 A * | 10/1986 | Bogren | B65D 3/22 493/103 |
| 5,221,028 A | 6/1993 | Dwinell | |
| 5,275,767 A | 1/1994 | Micciche | |
| 8,852,493 B2 * | 10/2014 | Rasanen | B29C 53/34 264/339 |
| 2019/0157825 A1 * | 5/2019 | Schneider | H01R 43/048 |
| 2023/0294199 A1 * | 9/2023 | Buchty | B23K 20/10 228/1.1 |

FOREIGN PATENT DOCUMENTS

| | | |
|---|---|---|
| DE | 2159930 A | 6/1972 |
| EP | 0002833 A1 | 11/1979 |
| WO | 2019233553 A1 | 12/2019 |

OTHER PUBLICATIONS

Perret, William, European Search Report (German), dated Aug. 11, 2023, European Patent Application No. EP23159322.9.

* cited by examiner

Primary Examiner — Erin B Saad
(74) Attorney, Agent, or Firm — PAUL & PAUL

(57) ABSTRACT

The present invention relates to a sonotrode for crimping an edge of a container having an end face, which is intended to contact the edge of the container during a relative movement along a longitudinal axis, wherein the end face comprises a crimping portion, at least portions of which form an angle with the longitudinal axis that is greater than 0° and is less than 90°, and the crimping portion is intended to contact the edge being crimped.

14 Claims, 4 Drawing Sheets

CRIMPING SONOTRODE

CROSS-REFERENCE TO RELATED APPLICATION

Figure 1:
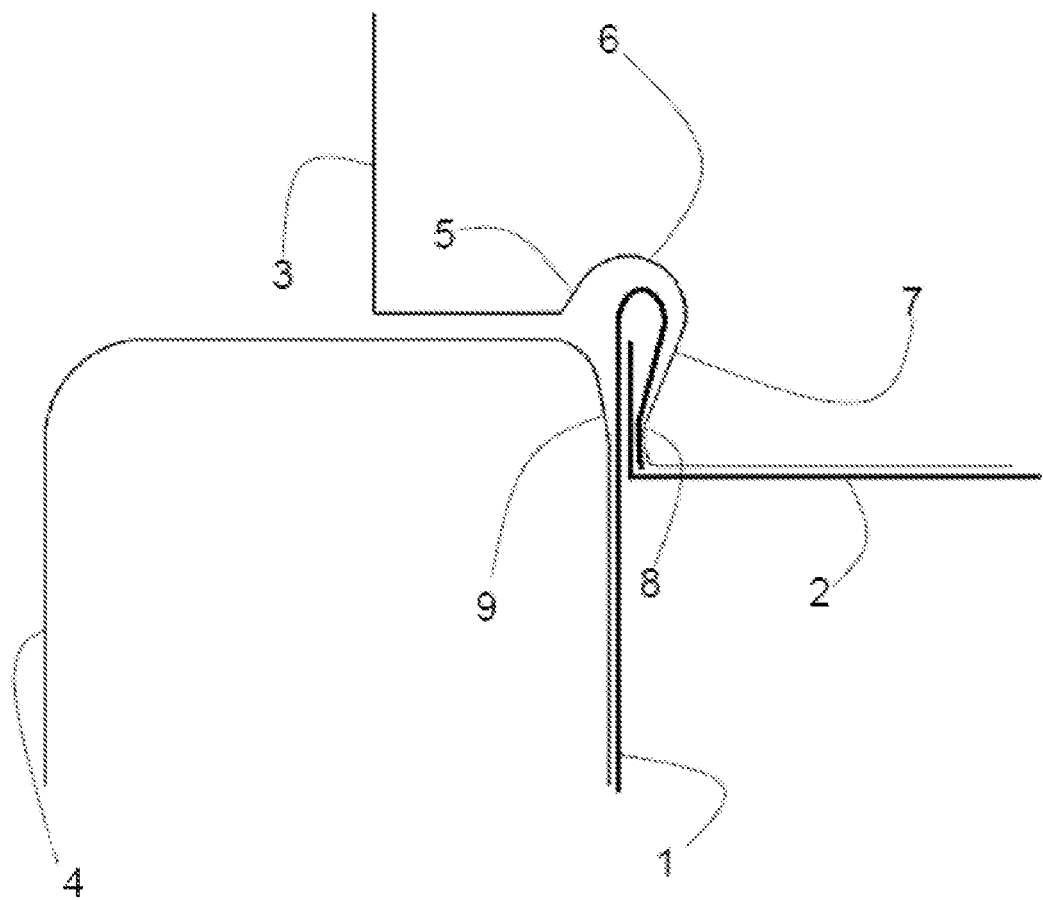

This application claims the priority of German Patent Application 10 2022 106 570.7, filed Mar. 21, 2022, which is incorporated herein in its entirety by reference.

The present invention relates to a sonotrode for crimping an edge of a container. For many containers, it is common to crimp one edge. During crimping, the edge is bent. The bending angle is often significantly greater than 90°.

A method for producing a crimping edge is known from EP 0 002 833. The corresponding crimping tools lead to a crushing load of the crimping area of the edge, which often leads to damage to the edge or an undefined buckling of the material.

It is therefore the object of the present invention to specify a device used for crimping an edge of a container, by means of which reliable bending of the edge is possible.

According to the invention, crimping an edge of a container is performed using a sonotrode excited by ultrasonic oscillation and having an end face, which is intended to contact the edge of the container during a relative movement along a longitudinal axis of the sonotrode, wherein the end face comprises a crimping portion, at least portions of which form an angle with the longitudinal axis that is greater than 0° and less than 90°, and the crimping portion is intended to contact the edge being crimped.

According to the present invention, the crimping portion is thus intended to bend the edge, which is moved outwards or inwards in the longitudinal direction along the longitudinal axis during processing. It has been shown that, by virtue of the ultrasonic vibration, this bending can occur surprisingly easily and without damage to the edge. In addition, there is no buckling of the edge at undesirable locations.

In one preferred embodiment, it is provided that the crimping portion comprises a concavely curved portion, which is intended to contact the crimping contact edge being crimped.

By means of the concave curved portion, the edge can be continuously bent further outwards or inwards as the edge is moved along the crimping portion. In a further preferred embodiment, it is provided that the end face comprises a groove, within which the crimping portion is arranged. The groove can comprise two opposing groove walls and a groove base connecting the grooves, which are designed such that the edge of the container is first guided along the one groove wall and is thereby bent outwardly or inwardly, then guided across the groove base, which is preferably concavely curved in order to bend the edge yet further outwards or inwards, before finally being guided along the second groove wall, so that the edge is bent significantly more than 90°, preferably more than 135°.

In a further preferred embodiment, it is provided that the end face comprises an inner end face portion and an outer end face portion, wherein the inner end face portion is separated from the outer end face portion via the groove. In other words, the groove is self-enclosed, and its shape substantially corresponds to the dimensions of the container edge. For example, the groove can be circular, square, rectangular, but also kidney-shaped in a view along the longitudinal axis.

Particularly preferred is an embodiment in which, in an axial direction perpendicular to the end face, either the inner end face portion protrudes over the outer end face portion, or the outer end face portion protrudes over the inner end face portion.

In a further preferred embodiment, it is provided that the groove comprises a wall which is connected to the inner end face portion, a wall which is connected to the outer end face cut, and a groove base which connects the two walls of the groove, wherein a wall of the groove comprises a bead, which preferably extends along the length of the entire groove. It has been shown that the bead can significantly improve the material guiding process during crimping.

In a further preferred embodiment, the wall adjoining the outer end face cut is inclined with respect to the longitudinal axis.

It can alternatively also be advantageous if the wall adjacent the end face portion, which is set back in the longitudinal direction with respect to the other end face portion, is inclined with respect to the longitudinal axis.

In a further preferred embodiment, the groove comprises a plurality of recesses and/or protrusions, wherein preferably at least 20 recesses and/or protrusions are provided.

The arrangement of the recesses and protrusions improves the bending behaviour of the edge during crimping.

The recesses and/or protrusions ideally have the same design and comprise a widening a in the direction of the groove, wherein adjacent recesses and/or protrusions are arranged at a distance b from one another in the direction of the groove. In one preferred embodiment, said distance b corresponds to approximately the widening a of the extensions and/or protrusions in the direction of the groove. In particular, $0.9 \times a < b < 1.1 \times a$ preferably applies.

In a further preferred embodiment, it is provided that the groove comprises a concavely curved groove base in a transverse sectional view perpendicular to the front face, wherein the concave curved portion preferably has a semicircular cross-section, wherein the semicircular cross-section particularly preferably has a radius of curvature of between 1 and 1.5 mm. In a further preferred embodiment, the radius of curvature is selected to be at least three times as large as the thickness of the edge of material being crimped.

The present invention also relates to an ultrasonic welding apparatus for crimping and welding an edge of a container by means of a sonotrode of the type described and a counter-tool. As already described, the sonotrode is intended to be moved towards the longitudinal axis during the crimping process. The counter-tool is arranged such that the crimped edge contacts the sonotrode and the counter-tool during the welding process.

In a preferred embodiment of the ultrasonic welding apparatus, a sonotrode is used in which, in an axial direction perpendicular to the end face, either the inner end face portion protrudes over the outer end face portion, or the outer end face portion protrudes over the inner end face portion. In this context, the sonotrode is intended to be moved back and forth between two positions, i.e., a starting position and a welding position, wherein the counter-tool comprises a sealing surface which, when arranged in the welding position opposite the groove wall adjoining the end face portion, which protrudes opposite the other end face portion, said sealing surface is arranged such that, when in the welding position, when the inner end face portion protrudes opposite the outer end face portion, the inner end face portion is arranged at least partially within a cavity of the counter-tool and, when the outer end face portion protrudes opposite the inner end face portion, the counter-tool is arranged at least partially within a cavity of the sonotrode. In other words, when in the welding position, the sealing surface of the counter-tool is arranged at a distance from the groove wall in a direction perpendicular to the longitudinal axis, which groove wall adjoins the end face cut, which protrudes opposite the other end face portion in the direction of the longitudinal axis.

In one preferred embodiment, when in the welding position, a gap remains between the sealing surface of the counter-tool and the groove wall adjoining the end face portion, which protrudes opposite the other end face portion, wherein the gap preferably is conical in a cross-sectional view parallel to the longitudinal direction. The advantage thereby is that the crimped portion is pushed into the gap during the relative movement between the sonotrode and the counter-tool.

Also described is a method for crimping an edge of a container, which method uses an ultrasonic welding device as described above, wherein the sonotrode is moved in the longitudinal direction on the counter-tool between a starting position and a welding position via a crimping position, the container being arranged such that the edge does not contact the sonotrode when in the initial position, the edge contacts the sonotrode when in a crimping position and, when in the welding position, the crimped edge is arranged between the sealing surface of the counter-tool and a sealing surface of the sonotrode.

In one preferred embodiment of the method, the container comprises a jacket element and a cover element enclosed by the jacket element, wherein the jacket element forms the edge of the container.

For example, in a first step it is possible to fix the cover element to the inner surface of a hollow cylinder formed by the jacket element and to then crimp the protruding edge of the jacket element as described.

Figure 2:
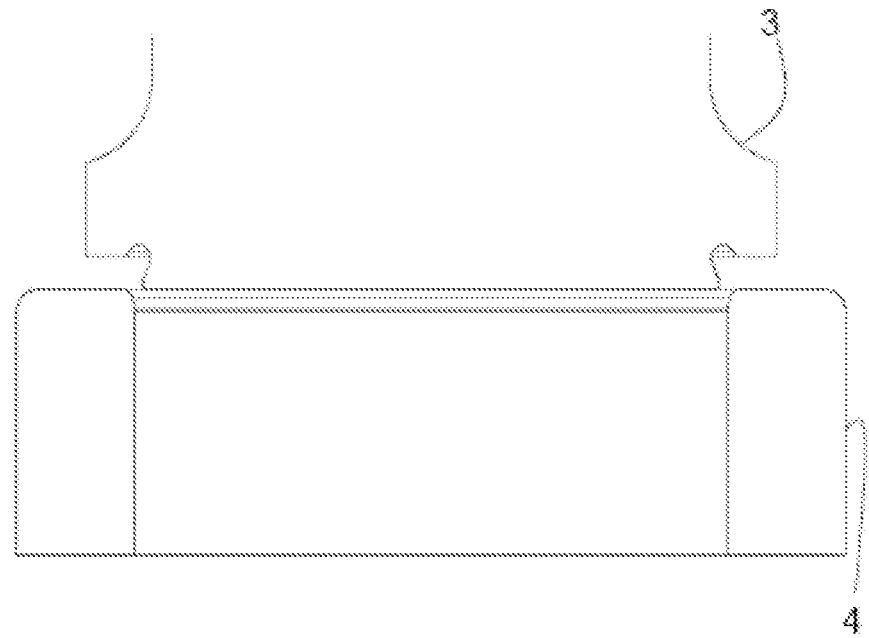
Figure 3:
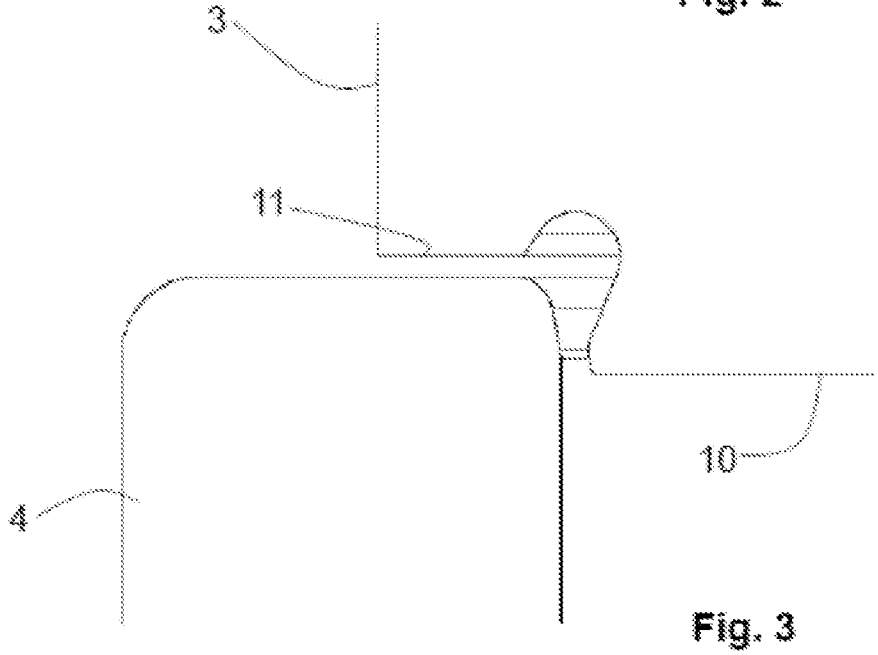

Further advantages, features, and possible applications of the present invention will become apparent from the description of a preferred embodiment hereinafter and the corresponding drawings. Shown are:

FIG. 1 a schematic representation of the relationships in the crimping process according to the invention, FIG. 2 a sectional side view onto a first embodiment of a sonotrode according to the invention, FIG. 3 a sectional partial detail enlargement of the embodiment of FIG. 2, FIGS. 4-8 show various views of a second embodiment of the sonotrode according to the invention.

FIG. 1 is a schematic illustration of the relationships during the crimping process according to the invention. The container being processed in this case comprises a sheath element 1, which can, e.g., be in the shape of a hollow cylinder. On the inner surface of the jacket element 1, a cover element 2 is connected to the sheath element 1.

It can be seen in FIG. 1 that the outer portions of the cover element 2 are curved upwards such that they run parallel to the jacket element 1.

In a starting position of the sonotrode (not shown in the drawings) the sonotrode 3 is at a distance from the counter-tool 4 in the longitudinal direction, i.e., in FIG. 1 in the vertical direction. In this position (not shown), the jacket element 1 is not yet bent.

In order to crimp the upper edge so it lies approximately in the position shown in FIG. 1, a sonotrode 3 according to the invention is used and is moved towards the upper edge of the jacket element 1 in the direction of its longitudinal axis, i.e. vertically in FIG. 1. The sonotrode 3 comprises a groove having a first wall 5, a second wall 7, and a groove base 6, which is curved concavely, i.e., is provided with a radius of curvature in this case.

During the relative movement of the sonotrode 3 in the direction of the edge of the jacket element 1, i.e. in the vertical direction, the upper edge of the jacket element 1 first contacts the wall 5 of the sonotrode, which is inclined with respect to the vertical direction, i.e., with respect to the longitudinal axis of the sonotrode 3, at an angle of inclination that is greater than 0 and less than 90°.

Once the upper edge of the jacket element 1 contacts the inclined wall 5, the upper edge of the jacket element 1 is bent inwardly, i.e., in FIG. 1 to the right.

As soon as the upper edge then contacts the groove base 6, the bending of the upper edge of the jacket element 1 is further performed until the edge of the jacket element 1 reaches the other wall 7 and then reaches approximately the position shown in FIG. 1.

In this embodiment, a nose 8 designed as a bead is then provided in the wall 7, which bead pushes the crimped edge portion outwards. However, the bead 8 is not absolutely necessary.

Also illustrated is an anvil 4, which comprises a conical sealing surface 9, so that the distance between the wall 7 and the conical sealing surface 9 is reduced when the sonotrode 3 moves towards the anvil 4, i.e., towards the longitudinal axis. Using the tool, not only the upper edge of the container is therefore crimped, but also the crimped edge portion is welded to the cover element 2 and the jacket element 1, so that the crimping provides additional support for the cover 2.

The position shown in FIG. 1 is the welding position. Between the initial position described and the welding position lies the crimping position, during which the jacket element comes into sequential contact with the groove walls 5, 7 and the groove base 6 and is bent.

FIGS. 2 and 3 show a sectional view and a partial view of a first embodiment of the sonotrode according to the invention together with the associated anvil 4. The relationships substantially correspond to the representation shown in FIG. 1. It can be seen that the sealing surface of the sonotrode comprises an inner end face portion 10 and an outer end face portion 11, wherein the inner end face portion 10 protrudes towards the longitudinal axis via the outer end face portion 11. The groove comprising the crimping portion is arranged between the inner end face portion 10 and the outer end face portion 11. The anvil 4 is arranged opposite the outer end face portion 11.

FIGS. 4-8 show various views of a second sonotrode according to the present invention.

Figure 4:
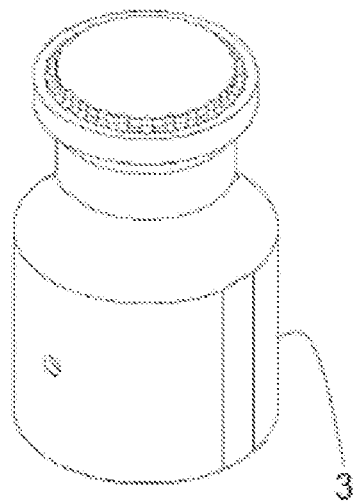
Figure 5:
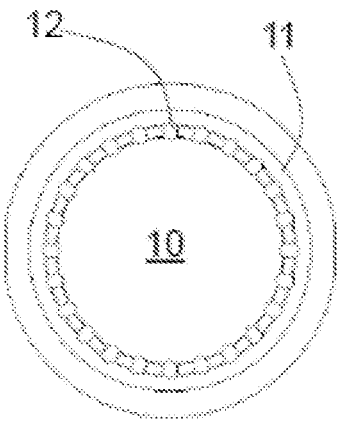
Figure 6:
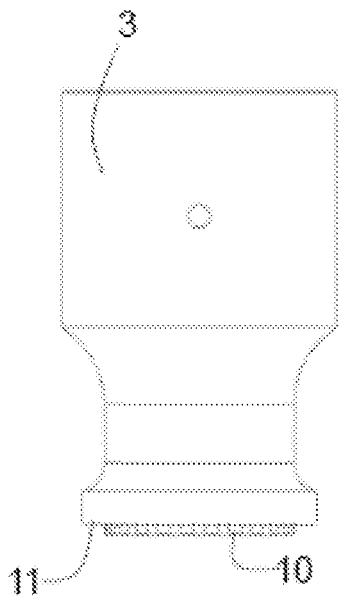

In FIG. 4, a perspective view of the sonotrode is shown, wherein the end face here points upward. The longitudinal axis in FIG. 4 is also in vertical direction. FIG. 5 shows an overhead view of the end face, which comprises an inner end face portion 10 and an outer end face portion 11. Arranged between the two end face portions 10, 11 is the groove 12, which in this case comprises a series of facets, i.e. sunken depressions, wherein the depressions in this embodiment have a width that is wider than the groove width. In FIG. 6, a side view of the sonotrode is shown, in which it can be seen that the facets extend to the inner groove wall connecting the groove to the inner end face portion 10.

Figure 7:
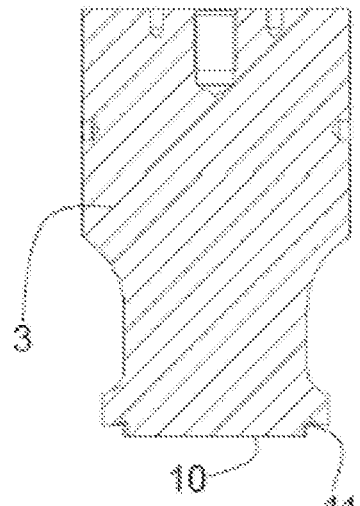
Figure 8:
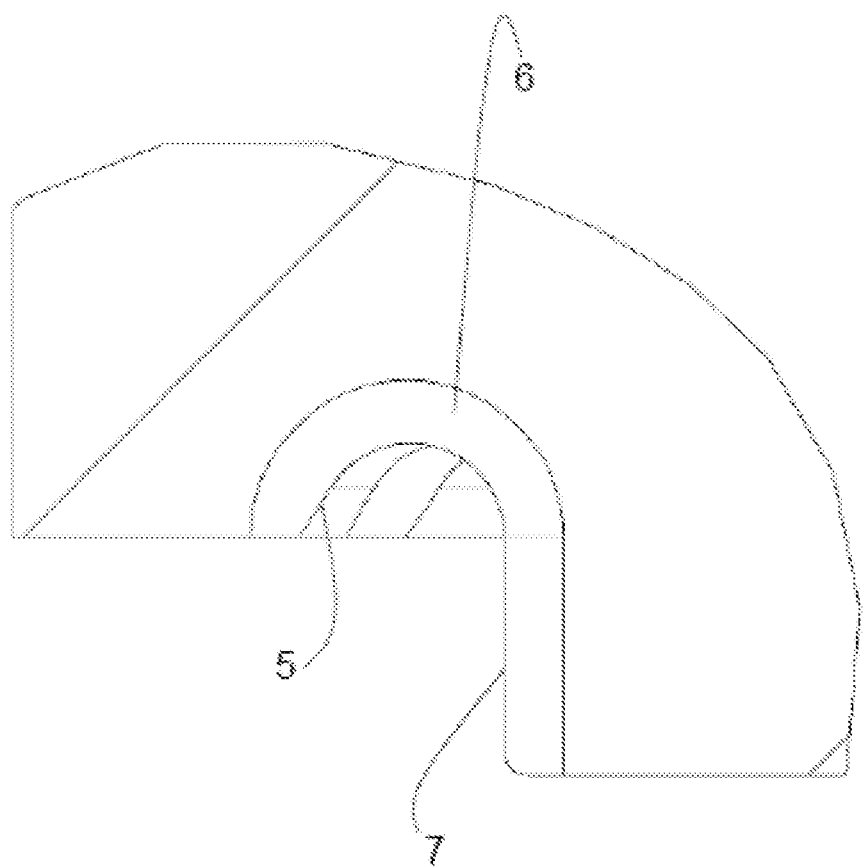

FIG. 7 is a sectional view of the sonotrode 3. Finally, a partial sectional view is shown in FIG. 8. It can be seen that the groove differs from the groove in embodiments 2 and 3 substantially in that the inner groove wall 7 is oriented in the direction of the longitudinal axis in this case. Also in this case, the material being crimped is arranged such that the edge of the container first contacts the groove wall 5, which is inclined between 0 and 90° with respect to the horizontal, the container wall being bent inward, i.e., to the right in FIG. 8. The edge then passes over the concavely curved portion 6, which is formed by the groove base 6 and is crimped in the direction the groove wall 7.

Through the use of ultrasonics, it is possible to achieve the described crimping with little energy and very reliably along with very little incorrect crimping.

LIST OF REFERENCE NUMBERS

1 Jacket element
2 Cover element
3 Sonotrode
4 Anvil
5 Groove wall
6 Groove base
7 Groove wall
8 Bead
9 Sealing surface
10 Inner end face portion
11 Outer end face portion
12 Groove

The invention claimed is:

1. A sonotrode for crimping an edge of a container, the sonotrode having an end face, the sonotrode being adapted to contact the edge of the container during a relative movement along a longitudinal axis, wherein the end face comprises a crimping portion, at least portions of the crimping portion forming an angle with the longitudinal axis that is greater than 0° and is smaller than 90° and the crimping portion being adapted to contact a crimping edge,
the end face comprising a groove, the crimping portion being arranged within the groove,
the end face comprising an inner end face portion and an outer end face portion, wherein the inner end face portion is separated from the outer end face portion via the groove,
characterized in that, in an axial direction perpendicular to the end face, either the inner end face portion protrudes over the outer end face portion, or the outer end face portion protrudes over the inner end face portion.

2. The sonotrode according to claim 1, characterized in that the crimping portion comprises a concavely curved portion, the concavely curved portion being adapted to contact the edge being crimped.

3. The sonotrode according to claim 1, characterized in that the groove comprises a wall adjoining the inner end face portion, a wall adjoining the outer end face portion, and a groove base connecting the two walls of the groove, wherein one wall of the groove comprises a bead.

4. The sonotrode according to claim 1, characterized in that the groove comprises a plurality of recesses and/or protrusions.

5. The sonotrode according to claim 4, characterized in that the recesses and/or protrusions have the same design and have a widening a in the direction of the groove, wherein adjacent recesses and/or protrusions are arranged in the direction of the groove at a distance b from one another.

6. The sonotrode according to claim 4, characterized in that the groove comprises a concavely curved groove base in a cross-sectional view perpendicular to the end face.

7. An ultrasonic welding apparatus for crimping and welding an edge of a container by means of a counter-tool and a sonotrode for crimping an edge of a container, the sonotrode having an end face, the sonotrode being adapted to contact the edge of the container during a relative movement along a longitudinal axis, wherein the end face comprises a crimping portion, at least portions of the crimping portion forming an angle with the longitudinal axis that is greater than 0° and is smaller than 90° and the crimping portion being adapted to contact a crimping edge,
wherein the sonotrode is characterized in that the end face comprises a groove, the crimping portion being arranged within the groove, the end face comprising an inner end face portion and an outer end face portion, wherein the inner end face portion is separated from the outer end face portion via the groove, wherein in an axial direction perpendicular to the end face, either the inner end face portion protrudes over the outer end face portion, or the outer end face portion protrudes over the inner end face portion, and wherein the sonotrode is intended to be adapted to be moved between two positions, an initial position and a welding position, wherein the counter-tool comprises a sealing surface which, when in the welding position of the groove wall adjoining the end face portion, which protrudes opposite the other end face portion, said sealing surface is arranged opposite such that, when in the welding position, when the inner end face portion protrudes opposite the outer end face portion, the inner end face portion is arranged at least partially within a cavity of the counter-tool and, when the outer end face portion protrudes opposite the inner end face portion, the counter-tool is arranged at least partially within a cavity of the sonotrode.

8. The ultrasonic welding device according to claim 7, characterized in that, when in the welding position between the sealing surface of the counter-tool and the groove wall, which is adjacent to the end face portion protruding opposite the other end face portion, a gap remains.

9. The sonotrode according to claim 3, wherein the bead extends along the entire groove.

10. The sonotrode according to claim 4, wherein at least 20 recesses and/or protrusions are provided.

11. The sonotrode according to claim 5, wherein 0.9 a<b<1.1 a.

12. The sonotrode according to claim 6, wherein the concavely curved portion comprises a semicircular cross-section.

13. The sonotrode according to claim 12, wherein the semicircular cross-section has a radius of curvature of between 1 and 1.5 mm.

14. The ultrasonic welding device according to claim 8, wherein the gap is conical in a cross-sectional view parallel to the longitudinal direction.

* * * * *